United States Patent Office 3,651,225
Patented Mar. 21, 1972

3,651,225
SYNERGISTIC INSECTICIDAL AND
NEMATOCIDAL COMPOSITIONS
Fred Morris Gordon, Princeton, N.J., assignor to
American Cyanamid Company, Stamford, Conn.
No Drawing. Filed June 10, 1969, Ser. No. 831,997
Int. Cl. A01n 9/36
U.S. Cl. 424—200
3 Claims

ABSTRACT OF THE DISCLOSURE

A synergistic insecticidal, and nematocidal composition is given containing an alkylmercaptoalkyl O,O-dialkyldithiophosphate and a dialkyl pyrazinyl phosphorothioate. More particularly, this invention relates to compositions of O,O-diethyl S-(ethylthio)methyl phosphorodithioate and O,O-diethyl O-(2-pyrazinyl) phosphorothioate wherein said components are present in the ratio of about 2 to 10 parts of O,O-diethyl S-(ethylthio)methyl phosphorodithioate to 1 part of O,O-diethyl O-(2-pyrazinyl) phosphorothioate and the efficacy of each of said compounds is inordinately enhanced by the presence of the other.

---

This invention relates to insecticidal and nematocidal compositions intended primarily for use in agronomy, but also applicable in combatting insects and nematodes in other areas of industry. The invention has as its principal object the provision of synergistic compositions possessing a combination of two unusual properties: a longer effective biocidal life than either of their two essential ingredients, used alone, and an increased biocidal activity such that insects and nematodes can be effectively controlled by the application of much smaller quantities of the mixture than when the two ingredients are used separately.

I have found that these two types of synergistic action are obtained in compositions wherein the principal biocide is a mixture of an O,O-di-(lower alkyl) O-(2-pyrazinyl) phosphorothioate with from about 2 to 10 and preferably from 2 to about 5 times its weight of an alkylmercaptoalkyl O,O-dialkyldithiophosphate of the type hereinafter more fully defined. I have found that crops can be protected for long periods of time from insect and nematode attack by applying thereto sufficient amounts, which are hereinafter sometimes designated as insecticidally and nematocidally effective amounts, of the above-described two ingredients in the proportions indicated. This is a very important discovery, for it permits protection against an entire generation of many insects pests—often covering a ten to twelve week period—by a single application of the mixture to the soil. For similar reasons the mixtures will give extended biocidal life and increased biocidal activity when applied to the leaves or stalks of plants such as beans and other garden vegetables, and will in many cases provide effective seasonal protection from a single application.

My present invention, therefore, resides in the provision of biocidal compositions consisting essentially of mixtures of one or more of the indicated O,O-dialkyl O-(2-pyrazinyl) phosphorothioates with one or more of the indicated alkylmercaptoalkyl O,O-dialkyl dithiophosphates in the synergistically effective proportions of from 1:2 to 1:10 and preferably from 1:2 to about 1:5 by weight, together with inert solid or liquid carriers or diluents, dispersants, emulsifiers, sticker-spreaders and the like if desired, and in methods wherein insecticidally and nematocidally effective quantities of these mixtures are applied to insects or nematodes, or both, or to the soil or plants to be protected therefrom.

Each of the two essential ingredients of my new synergistic compositions is known and is known to be an effective insectidide. The O,O-di-(lower alkyl) O-(2-pyrazinyl) phosphorothioates, including the O,O-dimethyl, O,O-diethyl, O,O-diisopropyl, and O,O-dibutyl compounds, in which the pyrazine group is substituted or unsubstituted, are described in U.S. Pat. No. 2,918,468 as insecticides and in No. 2,938,831 as nematocides. The full disclosures of these two patents are incorporated herein by reference, it being understood that any of 2-pyrazinyl phosphorothioates described therein may be used in preparing the synergistic compositions of the present invention.

The alkylmercaptoalkyl O,O-dialkyl dithiophosphates which constitute the major ingredient of my new compositions are defined accurately by the formula:

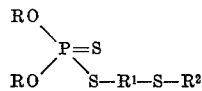

in which R is an alkyl radical of from 1 to about 4 carbon atoms, $R^1$ is an alkylene radical of from 1 to 2 carbon atoms (i.e., it is either a methylene or ethylene radical) and $R^2$ is a lower alkyl radical (i.e., of from 1 to about 4 carbon atoms). The compounds of this class are described as insecticides in U.S. Pats. Nos. 2,596,076 and 2,759,010, the disclosures of which are incorporated herein by reference.

It will be understood that the extended effective biocidal life and the increased biocidal activity which characterize the synergism of the present invention is exhibited in all mixtures wherein any of the above-described O,O-di-(lower alkyl) O-(2-pyrazinyl) phosphorothioates is present together with from 2 to 10 times its weight of any of the alkylmercaptoalkyl O,O-dialkyl dithiophosphates of the above Formula I. The preferred compounds are O,O-diethyl O-(2-pyrazinyl) phosphorothioate and O,O-diethyl S-(ethylthio)methyl phosphorodithioate respectively, since each of these compounds is now being sold commercially and is therefore easily available in substantial quantities, but it will be understood that the invention in its broader aspects is not limited thereto.

The toxicant compositions of this invention can be effectively used in any conventional type of application whereby an effective amount is applied to soil or plants. In practice, the compositions containing from about 2 to 10 parts by weight of O,O-diethyl S-(ethylthio)methyl phosphorodithioate for each part of O,O-diethyl O-(2-pyrazinyl) phosphorothioate, may be prepared as solid or liquid formulations and applied to either the foliage of plants sought to be protected or to the soil in which crops are growing or will be grown. Solid formulations may include wettable powders, emulsifiable concentrates, and the toxicant in admixture with fertilizer or granular formulations.

Dust or dust concentrates may be prepared by grinding together from about 2% to 25% by weight of a synergistic mixture containing from about 2 to 10 parts of O,O-diethyl S-(ethylthio)methyl phosphorodithioate for each part of O,O-diethyl O-(2-pyrazinyl) phosphorothioate, and from about 75% to 98% by weight of a solid inert carrier such as attapulgite, kaolin, diatomaceous earth, fuller's earth, talc or the like.

Granular formulations may be prepared by applying from about 5% to 25% by weight of the synergistic mixture to a granular carrier such as attapulgite or diatomaceous earth. The granular carrier should have an average particle size of from −15 to +60 mesh and preferably from −30 to +60 mesh. In practice a deactivator is generally applied to the granules before treatment with the synergistic mixture but if desired it can be admixed with the toxicants and applied with them. Generally the deactivator is from 1 to 20% but more preferably from 2 to 10% by weight of the granular formulation. The deactivator may be selected from the group consisting of alkyl phosphites including dialkyl phosphites, and trialkyl phosphites, as for example, dimethyl, diethyl, diisopropyl, dibutyl, bis(2-ethylhexyl) phosphite, trimethyl, triethyl, tris(2-chloroethyl), tributyl, tributyl-2-ethylhexyl, and triisohexyl phosphite, and additional activators may include lower alkylene glycols having from 2 to 8 carbon atoms such as, for example, diethylene glycol. A preferred deactivator is tributyl phosphite.

The granular formulation is generally prepared by dissolving the toxicants, in appropriate ratio, in an organic solvent such as a monocyclic hydrocarbon, a one to four carbon alcohol, a one to eight carbon ketone, or a heavy aromatic solvent having 95% or more aromatics and a specific gravity between .88 and 1.5 at 60° F. and including xylene, isopropanol, cyclohexanone, isobutylketone, Panasol AN-2, 3 or 5 and the like, spraying a tumbling bed of granular particles with the solution and drying the sprayed particles. Where non-sorptive granules such as sand are used, the solution of toxicant is usually sprayed on the rolling bed of sand granules until the granules are coated with toxicant. Then a finely divided powder such as clay, talc, or the like is added to the particulate mass and tumbling is continued until uniformly coated particles are obtained.

Wettable powders are prepared in much the same way as dusts excepting that generally about 25 to 90 parts by weight of the 2 to 1 to 10 to 1 synergistic toxicant mixture is air milled with about 25 to 90 parts by weight of an inert solid diluent. About 2% to 10% of a dispersant such as sodium lignosulfonate, sodium N-methyl-N-oleoyltaurate or the like, based on the weight of the biocide-diluent mixture, and from about 2% to 5% on the same basis of an emulsifier are then added. These formulations are usually dispersed in water and then applied as a liquid spray.

Emulsifiable concentrates may be prepared by admixing about 25 to 90 parts of a 2:1 to 10 to 1 toxicant mixture with about 90 to 25 parts of an organic solvent, as described above in granular preparations, and about 1 to 10 parts by weight of a surfactant. A preferred formulation contains about 45% by weight of the above-named phosphorodithioate with about 22% by weight of the above-named pyrazinyl phosphorothioate and about 10% by weight of a nonionic-anionic emulsifier (i.e., nonylphenol-ethylene oxide adduct+calcium dodecylbenzenesulfonate) and q.s. to 100% with xylene. This concentrate is then diluted with water for spray application.

Generally, most effective pest control and crop protection is achieved when the compositions of the invention are applied at planting time in the furrow ½ to 1 inch above the seed. However, these compositions may also be applied in a band, at the base of plants or with crops such as barley, rice or sugar beets application may be made with aerial or ground equipment by broadcasting. Usually ¾ lb. to 8 lbs. per acre and preferably ¾ lb. to 6 lbs. per acre is sufficient for effective insect and nematode control.

The invention will be further described and illustrated by the following specific examples to which, however, it is not limited.

EXAMPLE 1

The extended effective biocidal life of the compositions of the present invention, as compared with the lives of its two principal ingredients when used separately, is shown by the following results.

Test compounds and compositions are made up as dilute solutions using 65% acetone. An aliquot of dilute solution containing the desired number of milligrams of toxicant is distributed uniformly throughout one quart of soil by mechanical mixing. The treated soil is then evenly distributed between duplicate pint containers without closures. Water is then added to bring the soil to approximately 50% of moisture holding capacity. The treated soil is stored in a constant temperature room of about 78° F. As the soil dries more water is added to bring the moisture back to the desired level.

Periodically, starting at 0 days and thereafter at 7-day intervals for 43 days the soil is removed from the containers, thoroughly mixed, and duplicate 2 ounce subsamples are removed for bioassay with second instar Southern corn rootworm larvae (*Diabrotica undecimpunctata*) to determine the length of residual toxicity of these compounds alone and in combination.

The bioassay technique consists of filling a 2 ounce wide-mouth glass screw-top jar with moist soil, mixing in this soil about 100 millet seed for food for the Southern corn rootworm. Ten larvae are added to each jar of soil and the jars loosely capped to prevent rapid drying of the soil. Larval counts are made after 6 days and corrected percent mortality calculated. Data obtained are reported in Table I which demonstrate the marked synergism of the compositions of the present invention. In said table O,O-diethyl S-(ethylthio)methyl phosphorodithioate is identified as compound A and O,O-diethyl O-(2pyrazinyl) phosphorothioate is compound B.

TABLE I

| Prairie soil | Toxicant, mg./qt. soil | Percent control at— | | |
|---|---|---|---|---|
| | | 0 days | 14 days | 35 days |
| Compound | | | | |
| A | 2.0 | 100 | 33 | 0 |
| B | 0.5 | 100 | 89 | 0 |
| Mixture | | | | |
| A | 2.0+ | | | |
| B | 0.5 | 100 | 100 | 100 |
| Compound | | | | |
| A | 4.0 | 100 | 100 | 30 |
| B | 0.4 | 100 | 94 | 0 |
| Mixture | | | | |
| A | 4.0+ | | | |
| B | 0.4 | 100 | 100 | 100 |

| Potting soil | Toxicant, mg./qt. soil | Percent control at— | | |
|---|---|---|---|---|
| | | 0 days | 28 days | 42 days |
| Compound | | | | |
| A | 3.0 | 100 | 100 | 12 |
| B | 0.3 | 100 | 94 | 39 |
| Mixture | | | | |
| A | 3.0+ | | | |
| B | 0.3 | 100 | 100 | 100 |
| Compound | | | | |
| A | 0.75 | 100 | 0 | 0 |
| B | 0.15 | 100 | 25 | 0 |
| Mixture | | | | |
| A | 0.75+ | | | |
| B | 0.15 | 100 | 100 | 84 |

NOTE —$A = (C_2H_5O)_2\overset{S}{\underset{\|}{P}} - SCH_2 - S - C_2H_5$

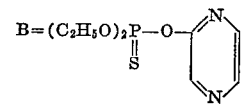

$B = (C_2H_5O)_2\underset{\|}{\overset{\|}{P}} - O -$ [pyrazinyl ring]

EXAMPLE 2

The synergistic activity of the compositions of the invention is further demonstrated by the following tests wherein yound Sieva lima bean plants are sprayed with test solutions or suspensions of O,O-diethyl S-(ethylthio) methyl phosphorodithioate; O,O-diethyl O-(2-pyrazinyl) phosphorothioate or mixtures thereof at rates sufficient to provide the equivalent of from 0.2 to 2 pounds per acre of test compound or from 0.8 to 1.5 pounds per acre of mixture. The plants are then placed on greenhouse benches. Two days after spraying leaves are cut from the plants and placed in petri dishes with moist filter papers in the bottom thereof. Ten third-instar Southern armyworms are then added to each dish and the dishes placed in a constant temperature and humidity room maintained at 80° F. and 60% R.H. for two days. At the end of the two day holding period mortality counts are made and recorded. Data obtained are reported in Table II below.

EXAMPLE 4

Preweighed amounts of O,O-diethyl S-(ethylthio) methyl phosphorodithioate 2%, O,O-diethyl O-(2-pyrazinyl) phosphorothioate 2%, a 2% mixture (10:1) and a 2% mixture (5:1) thereof were thoroughly mixed in

TABLE II

| Compound | | Rate lbs./acre | Compound | Rate lbs./acre | Percent mortality of Southern armyworms, age of residue in days | | Toxicant ratio |
|---|---|---|---|---|---|---|---|
| | | | | | 0 | 2 | |
| A | $(C_2H_5O)_2\overset{S}{\overset{\|}{P}}-SCH_2-S-C_2H_5$ | 2.0 | N.C. | ---- | 95 | 5 | ---- |
| B | N.C. | ---- | $(C_2H_5O)_2\overset{S}{\overset{\|}{P}}-O-\text{(pyrazinyl)}$ | 0.20 | 100 | 33 | ---- |
| C | $(C_2H_5O)_2\overset{S}{\overset{\|}{P}}-SCH_2-S-C_2H_5$ | 0.665 | Same as above | 0.133 | 100 | 100 | 5:1 |
| D | Same as above | 1.0 | ----do---- | 0.10 | 100 | 68 | 10:1 |
| E | ----do---- | 1.34 | ----do---- | 0.067 | 93 | 30 | 20:1 |

N.C.=No compound.

EXAMPLE 3

The synergistic activity of the compositions of the present invention is further established by the following tests employing False Wireworm larvae (*Eleodes suturalis*) as the test species of insect pest. These tests were conducted in the same manner as described in Example 1 above, excepting that False Wireworm larvae were substituted for Southern corn rootworm larvae and the test period was extended up to 49 days. The data obtained are reported in Table III below. In these tests as in the tests of Example 1, 1 mg./qt. of toxicant is approximately equivalent to 1 lb./acre of toxicant applied on a broadcast basis.

sandy loam soil and then evenly distributed among ½ pint containers. Root-knot nematode inoculum was added to the soil at 0, 10, 24 and 35 days after treatment. A seedling tomato indicator plant was planted immediately. About 30 days later the tomato plants were carefully washed free of soil and the percent control was estimated.

All treatments except those to be infested at 0 days were placed in the greenhouse and maintained under a regimen of alternate wetting (to about 50% moisture holding capacity) and drying. Before infesting with root-knot nematode inoculum the containers of soil were thoroughly mixed. These tests were twice replicated and rated accord-

TABLE III.—CONTROL OF FALSE WIREWORM [1] LARVAE IN POTTING SOIL

| $(C_2H_5O)_2\overset{S}{\overset{\|}{P}}-SCH_2-S-C_2H_5$ | Mg./qt. | $(C_2H_5O)_2\overset{S}{\overset{\|}{P}}-O-\text{(pyrazinyl)}$ | Mg./qt. | Percent control | |
|---|---|---|---|---|---|
| | | | | Initial | After 3 wks. |
| $(C_2H_5O)_2\overset{S}{\overset{\|}{P}}-SCH_2-S-C_2H_5$ | 2 | $(C_2H_5O)_2\overset{S}{\overset{\|}{P}}-O-\text{(pyrazinyl)}$ | ---- | 100 | 0 |
| Same as above | ---- | Same as above | 1 | 44 | 0 |
| Do | 2 | ----do---- | 1 | 100 | 100 |
| | | | | | After 6 wks |
| Do | 4 | ----do---- | ---- | 100 | 11 |
| Do | ---- | ----do---- | 1 | 44 | 0 |
| Do | 4 | ----do---- | 1 | 100 | 100 |
| | | | | | After 7 wks. |
| Do | 8 | ----do---- | ---- | 100 | 25 |
| Do | ---- | ----do---- | 1 | 44 | 0 |
| Do | 8 | ----do---- | 1 | 100 | 100 |

[1] *Eleodes suturalis.* ing to the Index set forth below. Data obtained are reported in Table IV.

TABLE IV.—ROOT-KNOT INDEX

[2=0 control; 1=50% control; T=95% control; 0=100% control]

| $(C_2H_5O)_2\overset{S}{\overset{\|}{P}}-SCH_2-S-C_2H_5$ Mg./qt. | $(C_2H_5O)_2\overset{S}{\overset{\|}{P}}-O-\underset{N}{\underset{\|}{\bigcirc}}^{N}$ Mg./qt. | Rating | Average percent control after 24 days |
|---|---|---|---|
| 10 | --- | 2-2 | 0 |
|  | 1 | 2-1 | 25 |
| 10 | 1 | T-T | 95 |
|  |  | After 35 days |  |
| 10 | --- | 2-2 | 0 |
|  | 2 | 2-1 | 25 |
| 10 | 2 | 0-0 | 100 |

EXAMPLE 5

In addition to the greatly extended effective biocidal life demonstrated in the preceding examples, the synergistic compositions of the invention also exhibit a much greater biocidal effect than does either of its two essential when used alone. This is shown by the following tests wherein the $LD_{50}$ (i.e., the minimum quantity needed to kill half of the test insects) of the composition is compared with that of each of its two ingredients taken alone.

Adult beetles of *D. virgifera* are collected from the field and individual beetles treated topically in the laboratory by applying one microliter of acetone solution containing appropriate amounts of O,O-diethyl S-(ethylthio)-methyl phosphorodithioate, O,O-diethyl O-(2-pyrazinyl) phosphorothioate or the combination of O,O-diethyl S-(ethylthio)methyl phosphorodithioate and O,O-diethyl O-(2-pyrazinyl) phosphorothioate to the ventral abdominal area. Mortality counts are made two hours after treatment. Eight dosage rates plus an acetone check are used to determine the $LD_{50}$ values.

TABLE V.—TOPICAL APPLICATION TO WESTERN CORN ROOTWORM ADULTS

|  | $LD_{50}$ micrograms/gm. of beetles | |
|---|---|---|
|  | Expected | Found |
| $(C_2H_5O)_2\overset{S}{\overset{\|}{P}}-SCH_2-S-C_2H_5$ | --- | 13.2857 |
| $(C_2H_5O)_2\overset{S}{\overset{\|}{P}}-O-\underset{N}{\underset{\|}{\bigcirc}}^{N}$ | --- | 0.9643 |
| $(C_2H_5O)_2\overset{S}{\overset{\|}{P}}-SCH_2-S-C_2H_5 + (C_2H_5O)_2\overset{S}{\overset{\|}{P}}-O-\underset{N}{\underset{\|}{\bigcirc}}^{N}$ | 10.8215 | 3.3571 |

The foregoing examples show the unexpected and unusual effectiveness of the preferred esters of the invention when used together in the proper synergistic proportions. These compounds, used separately, have met with wide acceptance as pest control agents in the field of agriculture since they are highly effective against a substantial variety of pests. However, neither compound has been entirely satisfactory since neither has the activity or residual life necessary to provide extended control of several of the more important economic pests, particularly the soil borne varieties, such as the Southern corn rootworm (*Diabrotica undecimpunctata howardi*), Western corn rootworm (*Diabrotica virgifera*), Northern corn rootworm (*Diabrotica longicornis*), false wireworm (*Eleodes suturalis*) and the rootknot nematode (*Meloidogyne sp.*) which are especially difficult to control and which are responsible for substantial damage to crops including corn, peanuts and wheat.

In the past chlorinated hydrocarbons have been used with measurable success in this area due largely to their persistence in the soil, however, such persistence has recently caused the public to look with some disfavor on many of these materials. Moreover, it has now become apparent that through the continued use of these persistent pesticides many insect species have become resistant to or have developed a tolerance for such materials. The Southern corn rootworm is one such pest. This insect is the larva of the spotted cucumber beetle. It hatches in the soil generally over a 3 to 5 week period depending on weather conditions and thereafter feeds on the roots of plants, particularly corn and peanuts, until it pupates. Since the effects of a single generation of these insects, in a given area, generally covers about a ten to twelve week period commencing about planting time, it has been a most accepted practice to apply persistent toxicants (i.e., chlorinated hydrocarbons) in sufficient amount at the time of planting to protect the crops until pupation has occurred and feeding has ceased. This practice has heretofore been highly satisfactory. However, with the development of resistance to the chlorinated hydrocarbons such practice can no longer be relied on to provide adequate crop protection and more effective compositions are essential if control of this insect is to be maintained.

The new toxicant compositions of the present invention provide the desired crop protection during the growing period. Furthermore, as another important advantage, these compositions dissipate or decompose so that the problem of residual toxicity does not have to be dealt with.

What is claimed is:

1. A synergistic insecticidal and nematocidal composition consisting essentially of a mixture of O,O-diethyl O-(2-pyrazinyl) phosphorothioate with from 2 to 10 times its weight of O,O-diethyl S-(ethylthio)methyl phosphorodithioate, said mixture having a longer effective biocidal life than either of its ingredients.

2. A method of protecting agronomic crops from insect and nematode attack which comprises applying to the soil in which said crops are grown a quantity of the composition of claim 1 sufficient to impart insecticidal and nematocidal properties thereto during the feeding period of said insects and nematodes on said crops.

3. The method of claim 2 wherein said composition is applied to said soil in quantities of from about three-fourths pound to six pounds per acre.

References Cited

UNITED STATES PATENTS

| | | | |
|---|---|---|---|
| 2,596,076 | 5/1952 | Hook et al. | 424—216 |
| 2,759,010 | 8/1956 | Lorenz et al. | 424—216 X |
| 2,918,468 | 12/1959 | Dixon et al. | 424—200 X |
| 2,938,831 | 5/1960 | Gordon | 424—200 |

ALBERT T. MEYERS, Primary Examiner

L. SCHENKMAN, Assistant Examiner

U.S. Cl. X.R.

424—216